UNITED STATES PATENT OFFICE.

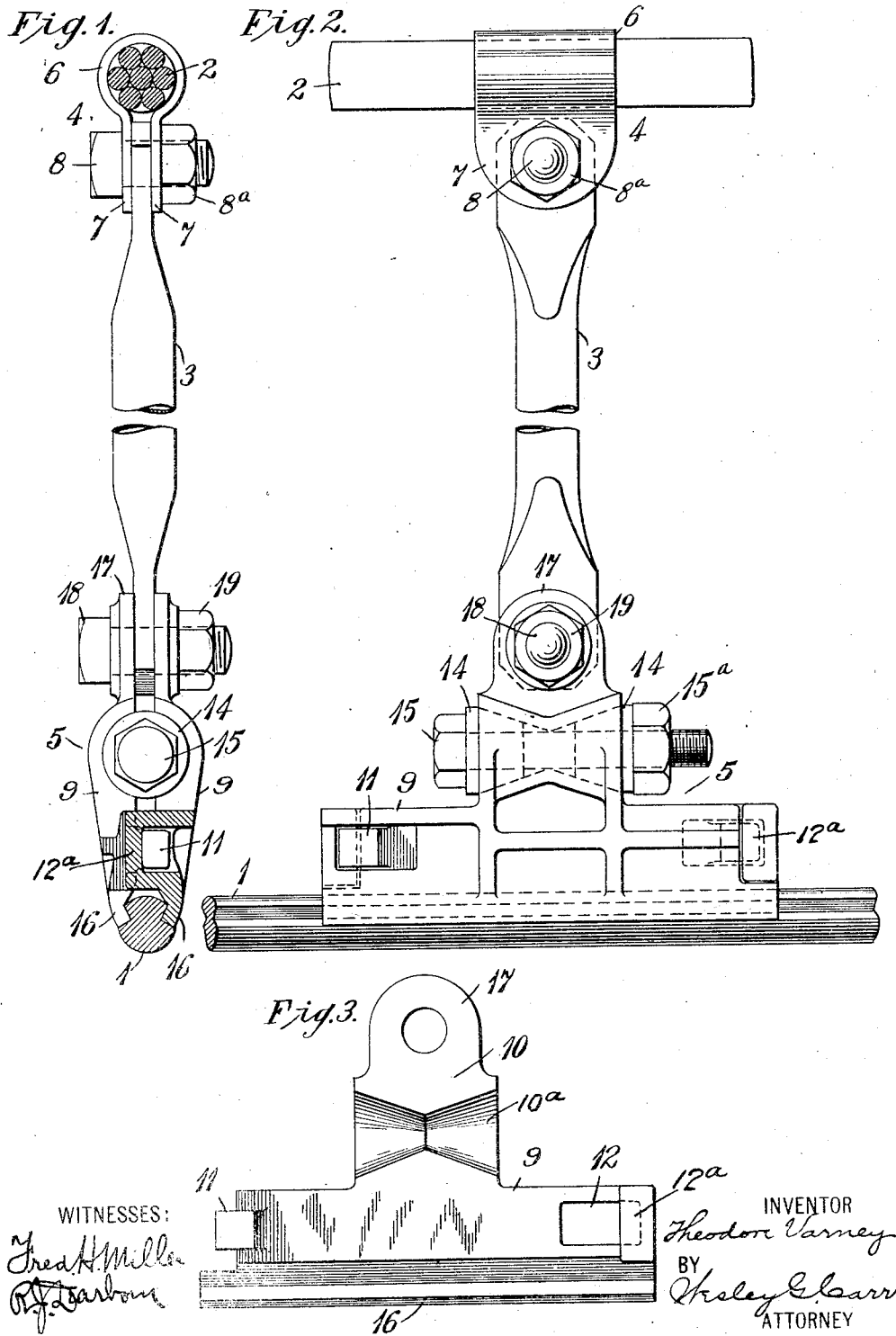

THEODORE VARNEY, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY-CLAMP.

No. 931,357.     Specification of Letters Patent.     Patented Aug. 17, 1909.

Application filed November 6, 1908. Serial No. 461,360.

*To all whom it may concern:*

Be it known that I, THEODORE VARNEY, a citizen of the United States, and a resident of Pittsburg, in the county of Allegheny and State of Pennsylvania, have invented a new and useful Improvement in Trolley-Clamps, of which the following is a specification.

My invention relates to means for suspending electric line conductors, and it has for its object to provide a clamping device which shall be simple and durable in construction and by means of which a trolley conductor may be adjusted without interfering with the hanger or support by which the clamp is suspended.

According to my present invention, I provide a clamping device which is specially adapted for use with trolley conductors that are suspended from messenger wires or cables and is also adaptable to various types of hangers, such as that referred to above.

One of the advantages in my clamp over those of the prior art lies in the fact that the clamping action and the means by which it is produced are entirely independent of the connection between the clamp and the hanger. The trolley conductor may, consequently, be adjusted, by reducing the pressure exerted in the clamp itself, without loosening or re-arranging the hanger in any way.

Figure 1 of the accompanying drawing is a partially sectional end elevation of a hanger rod having a trolley-conductor clamp which embodies my invention, and Fig. 2 is a side elevation of the structure shown in Fig. 1. Fig. 3 is an inner side elevation of one of the two duplicate jaws of the clamp shown in Figs. 1 and 2.

Referring to the drawings, a trolley conductor 1 is suspended from a messenger wire or cable 2 by means of a hanger rod 3, a cable clamp 4 and a trolley clamp 5. The cable clamp 4 comprises a loop 6 which surrounds the cable 2 and is provided with a pair of ears 7. The upper end of the connecting rod 3 is flattened to fit between the ears 7 and is secured in position by means of a bolt 8 and nut 8ª.

The trolley clamp 5 comprises a pair of interchangeable jaw members 9 each of which has a shank projection 10 at one edge, a laterally projecting hook lug 11, at one end, and a hole or recess 12 and a flange 12ª at the other end. The hook lug 11 of one jaw member is adapted to coöperate with the recess 12 and the flange 12ª of the other to lock the jaw members together, and the shank projections 10 are provided with complementary recesses 10ª which are tapered inwardly to form a double frusto-conical socket, the minimum diameter of which is midway between its ends. The jaw members may be forced together by means of a pair of taper plugs 14 which are drawn into the ends of the socket referred to above by means of a bolt 15 and nut 15ª. The adjacent clamping surfaces of the jaw members may be of considerable length and are provided with claws 16 or are otherwise adapted to conform to the shape of the trolley conductor 1, which may be grooved in a well known manner.

The upper extremities of the shank projections are provided with ears 17 between which is located the lower end of the hanger rod 3, these parts being secured together by means of a bolt 18 and nut 19. The bolt 18 is intended to provide a pivotal connection between the rod 3 and the clamping members and the nut 19 should not be so set as to interfere with the action of the taper plugs 14 and the clamping bolt 15.

It will be observed that the clamping bolt 15 is substantially parallel to the trolley conductor 1 and that its nut 15ª may be adjusted to withdraw or vary the clamping action of the jaw members without detaching any of the parts or interfering, in any way, with the hanger connections. In many cases, it will be found advantageous to temporarily suspend a trolley conductor by means of the hangers and clamps, the trolley wire being afterward put under the desired tension and adjusted before the clamps are finally tightened to prevent the trolley conductor from slipping through the jaws.

My trolley clamp comprises parts which are simple and interchangeable and the jaw members of which require no finishing and may be cast from malleable iron or similar material. The taper plugs, which are preferably finished, may be cheaply manufactured by automatic machinery and the only remaining parts are standard nuts and bolts.

The head of the clamping bolt 15 and the nut 15ª may be tapered, thereby rendering the taper plugs unnecessary, if desired, and other modifications may be effected within the scope of my invention.

I claim as my invention:

1. A clamp comprising a pair of separable hinge-connected jaw members having shanks provided with complementary double-taper recesses, and plugs located in said recesses and movable toward each other to turn the jaw members on their hinges.

2. A clamp comprising a pair of interchangeable jaw members having coöperating hook lugs, recesses and flanges, and shanks provided with complementary double taper recesses, plugs adapted to be forced into said recesses to move the jaws toward each other.

3. A trolley clamp comprising a pair of interchangeable jaw members having shanks provided with complementary double taper recesses, said jaw members having coöperating hook lugs, recesses and flanges for locking the jaw members together, taper plugs fitted into said recesses, and a bolt for drawing the plugs into the recesses to force the jaws together.

4. A trolley clamp comprising a pair of interchangeable jaw members having coöperating hook lugs, recesses and flanges for locking said members together and provided with shanks having complementary double taper recesses, taper plugs fitted into the ends of said recesses, and a bolt for drawing the plugs together to spread the shanks apart.

5. A trolley wire clamp comprising two hinge-connected members forming jaws at one side and a double-tapering split socket at the other side of the hinge-connections, and means adapted to engage the tapering walls of said socket to close the jaws.

In testimony whereof, I have hereunto subscribed my name this 21st day of Oct., 1908.

THEODORE VARNEY.

Witnesses:
  WILLIAM SCHAAKE,
  BIRNEY HINES.